(12) United States Patent  
Kamon et al.

(10) Patent No.: US 7,836,788 B2
(45) Date of Patent: Nov. 23, 2010

(54) ARTICULATED MANIPULATOR (75) Inventors: Masayuki Kamon, Akashi (JP); Eiichi Yagi, Kobe (JP)

(73) Assignees: Toyota Jidosha Kabushiki Kaisha, Toyota (JP); Kawasaki Jukogyo Kabushiki Kaisha, Kobe (JP)

( * ) Notice: Subject to any disclaimer, the term of this patent is extended or adjusted under 35 U.S.C. 154(b) by 1756 days.

(21) Appl. No.: 10/689,995

(22) Filed: Oct. 22, 2003

(65) Prior Publication Data

US 2004/0129103 A1    Jul. 8, 2004

(30) Foreign Application Priority Data

Oct. 30, 2002    (JP)    ............... 2002-316761

(51) Int. Cl.
*B25J 17/00*    (2006.01)

(52) U.S. Cl. ...................... 74/490.01; 901/15

(58) Field of Classification Search . 74/490.01–490.06; 414/735, 744.5; 901/15, 28, 29
See application file for complete search history.

(56) References Cited

U.S. PATENT DOCUMENTS

| | | | |
|---|---|---|---|
| 4,662,815 A | * | 5/1987 | Zimmer ...................... 414/735 |
| 4,736,645 A | * | 4/1988 | Zimmer ...................... 74/417 |
| 4,771,652 A | * | 9/1988 | Zimmer ...................... 74/640 |
| 4,904,148 A | | 2/1990 | Larsson |
| 4,990,050 A | * | 2/1991 | Tsuge et al. ............... 414/735 |
| 6,796,203 B2 | * | 9/2004 | Dubrowskij ............. 74/490.05 |

FOREIGN PATENT DOCUMENTS

| | | |
|---|---|---|
| EP | 0 153 884 A1 | 9/1985 |
| EP | 1 129 828 A1 | 9/2001 |
| JP | A 56-163624 | 12/1981 |
| JP | A 62-148182 | 7/1987 |
| JP | U 63-38991 | 3/1988 |
| JP | 4-115592 | * 10/1992 |
| JP | U 4-115592 | 10/1992 |
| JP | A-05-228863 | 9/1993 |
| JP | 10-225881 | * 8/1998 |
| JP | A 10-225881 | 8/1998 |
| JP | A 2001-138279 | 5/2001 |
| WO | WO 88/03856 | 6/1988 |

OTHER PUBLICATIONS

Proceedings of the 15 International Symposium on Industrial Robots; vol. 1; Sep. 11-13, 1985; pp. 199-206.

* cited by examiner

*Primary Examiner*—Thomas R Hannon
*Assistant Examiner*—James Pilkington
(74) *Attorney, Agent, or Firm*—Oliff & Berridge, PLC (57) ABSTRACT

An articulated manipulation device for increasing work volume that includes six links and corresponding joints. A first link connects to a base for rotation about a rotational axis aligned with the axis of the first link. A diagonal joint connects the first and second links, the second and third links, the third and fourth links and the fifth and sixth links. A coaxial joint connects the fourth and fifth links. The joints and links are configured to permit parallel and perpendicular axial rotation according to the specific arrangement of the links and angles of rotational inclination. The articulated manipulator has a large work volume.

3 Claims, 11 Drawing Sheets

ARTICULATED MANIPULATOR

BACKGROUND OF THE INVENTION

1. Field of the Invention

The present invention relates to an articulated manipulator formed by joining a plurality of links by rotary joints. More particularly, the present invention relates to an articulated manipulator including a plurality of links, and joints including coaxial joints each for coaxially connecting the two adjacent links, and diagonal joints each for connecting the two adjacent links such that one of the two links makes a conical revolution on the diagonal joint.

2. Description of the Related Art

A prior art articulated manipulator disclosed in, for example, JP62-148182A has two links connected by a diagonal joint. The diagonal joint connects the two links such that one of the two links makes a conical revolution on the diagonal joint. Each of the two adjacent links connected by the diagonal joint revolves about a rotation axis inclined at a predetermined angle to its axis.

Figure 10:
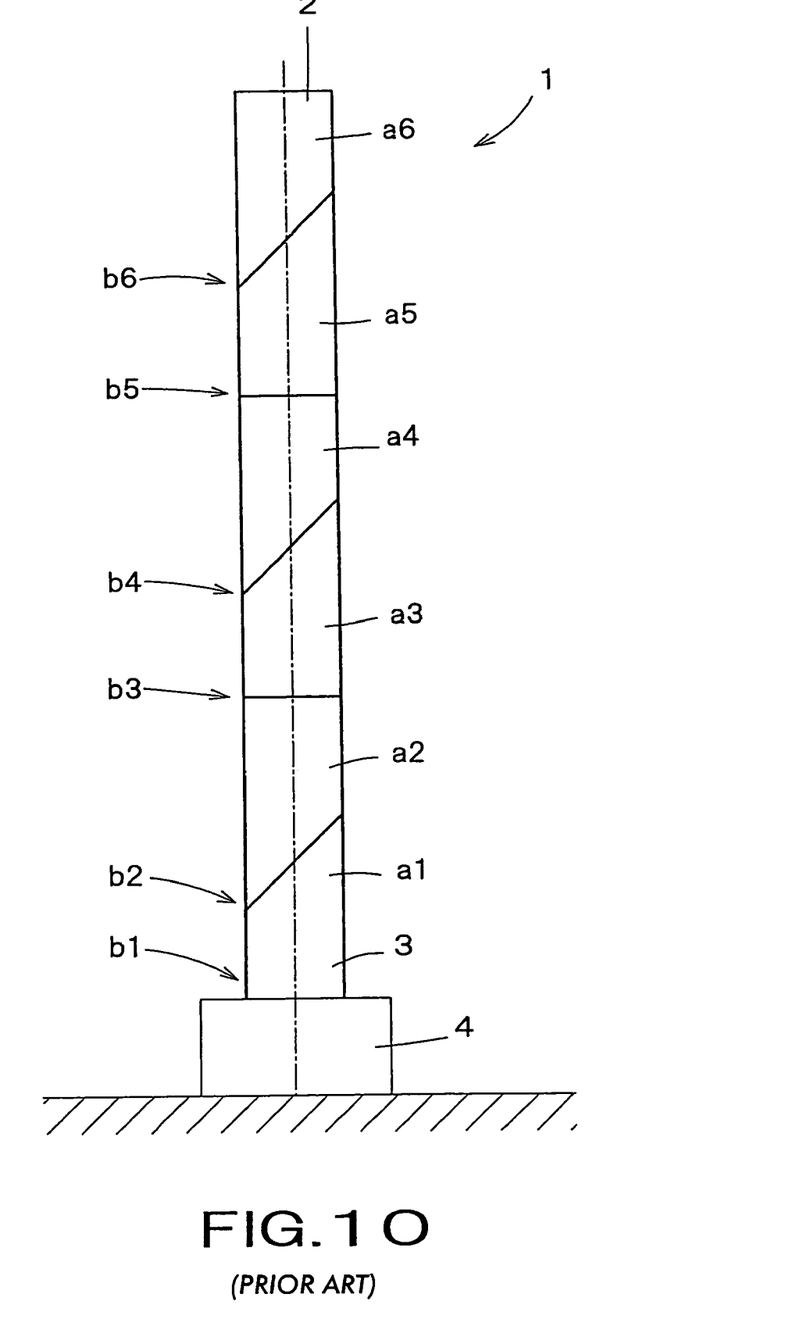
FIG. 10 is a schematic front elevation of a conventional articulated manipulator.

FIG. 10 is a front elevation of a conventional articulated manipulator 1. The articulated manipulator 1 includes a first link a1 to a sixth link a6, which are arranged linearly, and joints b1 to b6 connecting the adjacent ones of the links a1 to a6. The joints b1, b3 and b5 are coaxial joints, and the joints b2, b4 and b6 are diagonal joints. Each of the coaxial joints b1, b3 and b5 connects the two adjacent links so that the two adjacent links are able to rotate about their axes. Each of the diagonal joints b2, b4 and b6 connects the two adjacent links such that each of the two adjacent links is able to make a conical revolution about an axis inclined to its axis.

The articulated manipulator 1 formed by pivotally connecting the six links a1 to a6 by the joints b1 to b6 has six degrees of freedom. In the articulated manipulator 1, the coaxial joints b1, b3 and b5, and the diagonal joints b2, b4 and b6 are arranged alternately to connect the six links a1 to a6. Each of the six links a1 to a6 has one end connected to the adjacent link by the coaxial joint, and the other end connected to the adjacent link by the diagonal joint. The terminal part 2 of this articulated manipulator 1 is movable in a narrow space and the articulated manipulator has a small work volume.

Figure 11:
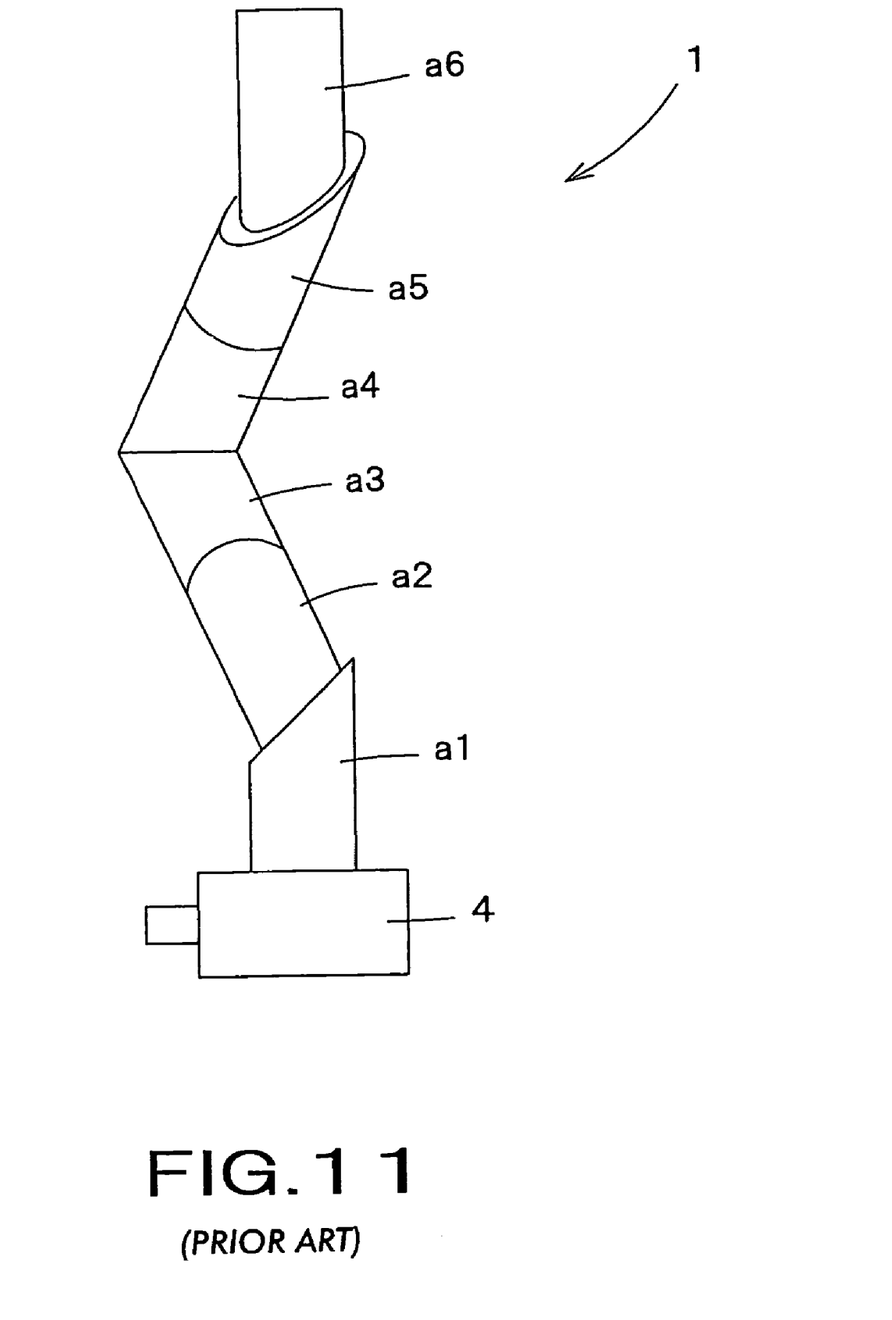
FIG. 11 is a schematic front elevation of a structure generated by the conventional articulated manipulator shown in FIG. 10.
Figure 12:
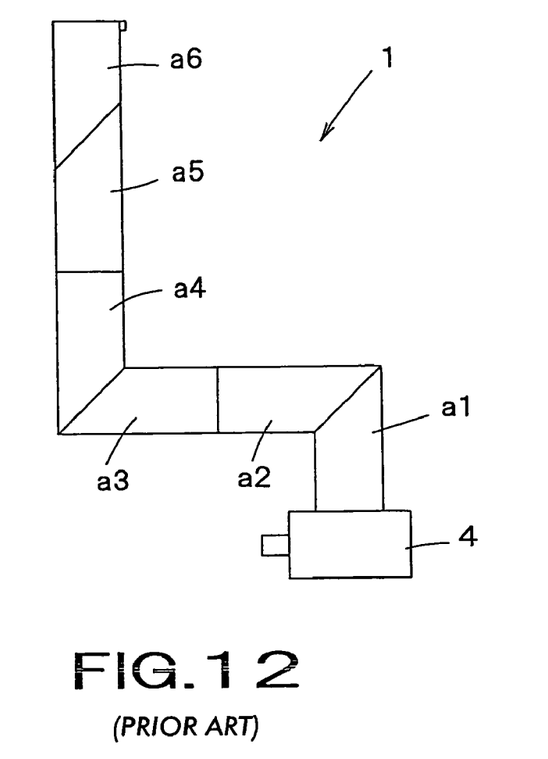
FIG. 12 is a schematic front elevation of a structure generated by the conventional articulated manipulator shown in FIG. 10.
Figure 13:
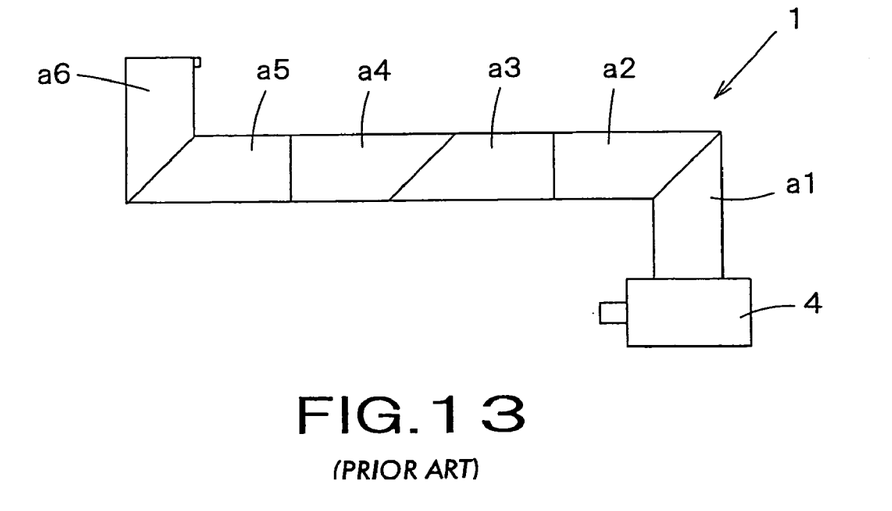
FIG. 13 is a schematic front elevation of a structure generated by the conventional articulated manipulator shown in FIG. 10.

FIGS. 11 to 13 are front elevations of the conventional articulated manipulator 1 having links a1 to a6. The position and orientation of the terminal part 2 of the articulated manipulator 1 are changed by turning the links a1 to a6. For example, the sixth link a6 can be moved in a direction parallel to the axis of the first link a1 with the sixth link a6 held coaxially with the first link a1 by turning the links a1 to a6 as shown in FIG. 11. The straight articulated manipulator 1 in which the links a1 to a6 are arranged straight can be bent in L-shapes as shown in FIGS. 12 and 13.

Figure 14:
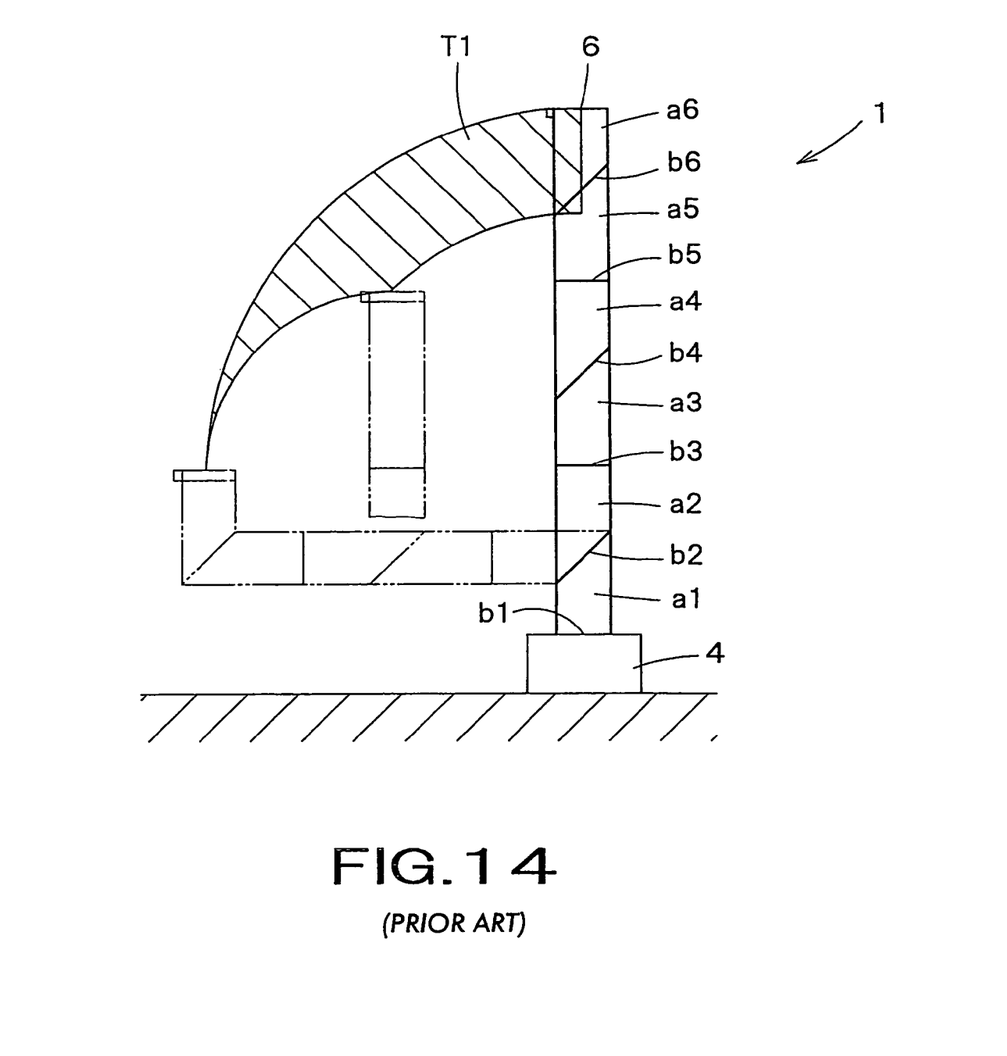
FIG. 14 is a diagrammatic view showing an operational space in which the conventional articulated manipulator shown in FIG. 10 operates.

FIG. 14 shows the work volume of the conventional articulated manipulator 1. When the coaxial joints b1, b3 and b5, and the diagonal joints b2, b4 and b6 are arranged alternately, only the links connected by the diagonal joints b2, b4 and b6 can be bent relative to each other. Consequently, the terminal part 2 of the articulated manipulator 1 is able to move only in a narrow operational space T1 in a predetermined orientation. More concretely, the sixth link a6 is unable to move satisfactorily toward a base 4, remaining in a predetermined orientation. Thus, the terminal part 2 of the conventional articulated manipulator 1 is able to move in the narrow operational space T1 and hence the articulated manipulator 1 has a small work volume.

SUMMARY OF THE INVENTION

Accordingly, it is an object of the present invention to provide an articulated manipulator having a large work volume.

According to the present invention, an articulated manipulator comprises: a plurality of links arranged in series; and joints pivotally connecting the adjacent links;

wherein the joints include coaxial joints each connecting the two adjacent links so that the two adjacent links are able to turn about a rotation axis coaxial with the axes of the two adjacent links, and diagonal joints each connecting the two adjacent links so that the two adjacent links are able to turn about an inclined rotation axis inclined at an angle of 45° to the axes of the two adjacent links, at least one specific link among those links has opposite ends connected by the diagonal joints to the adjacent links, and two rotation axes about which the adjacent links are turned, respectively, relative to the specific link are perpendicular to each other.

A straight arm assembly formed by connecting the links in series can be bent in a substantially U-shaped arm assembly by turning the links about rotation axes. The longitudinal size of the arm assembly measured along one of the links can be decreased by bending the arm assembly in a U-shape to bring a terminal part of the arm assembly near to a base part of the arm assembly. The terminal part of the arm assembly can be moved in a space around the base part by turning the links forming the arm assembly bent in the U-shape. Thus, the articulated manipulator has a large work volume.

If the axes of the specific link and the adjacent links are inclined at angles below 45° relative to each other, the angles between the axis of the specific link and those of the adjacent links exceeds 90° when the links are turned relative to each other. In such a case, when the arm assembly is bent in a U-shape, the adjacent links extend so as to separate longitudinally form the specific link with distance from the diagonal joints, and hence the terminal part of the arm assembly cannot be brought satisfactorily near to the base part.

If the axes of the specific link and the adjacent links are inclined at angles above 45° relative to each other, the angles between the axis of the specific link and those of the adjacent links are below 90° when the links are turned relative to each other. In such a case, when the arm assembly is bent in a U-shape, the adjacent links approach each other with distance from the diagonal joints, and hence there is a possibility that the two adjacent links interfere with each other at a distance from the specific link and collide against each other.

According to the present invention, the rotation axes about which the links connected to the specific link are turned are perpendicular to each other. Therefore, the specific link and the two adjacent links can be set substantially in a U-shape by turning the two adjacent links in parallel to each other in the same direction relative to the specific link. Thus, the two adjacent links do not interfere with each other, and the terminal part of the arm assembly can be brought longitudinally nearest to the base part. In this state, the terminal part of the arm assembly can be moved in a space around the base part by turning the links of the arm assembly. Thus, the articulated manipulator has a large work volume.

The two adjacent links connected to the opposite ends of the specific link by the diagonal joints can be extended at 90° relative to each other because the rotation axes about which the two adjacent links are turned relative to the specific link are inclined at 45° to the respective axes of the adjacent links. In a state where the arm assembly is bent substantially in a U-shape, the arm joint connecting one of the two adjacent links and the specific link, the diagonal joint connecting the other link and the specific link, and the two adjacent links can be included in a vertical plane. Thus, one of the diagonal joints does not project sideways relative to the other diagonal joint when the two adjacent links are bent in parallel to each other. Thus, the arm assembly bent in a U-shape has a small lateral size.

The rotation axes are inclined at the same angle of 45° to the axes of the two adjacent links. Therefore, an arithmetic procedure for calculating angles of rotation of the links to position the terminal part at a desired position in a desired orientation can be structured in a module; that is, the angles of rotation of the links can be determined by the same procedure in a short time with a small effort. Since the diagonal joints of the same construction are used, most of the parts of the diagonal joints are common parts and hence the number of types of necessary parts can be reduced.

The arm assembly can be bent substantially in a U-shape even when the coaxial joint connects the two links, and the two other links are connected to the free ends of the two links by the diagonal joints. However, such a method of connecting the links needs the four links and the three joints, and the distance between the two diagonal joints is long in a state where the arm assembly is bent substantially in a U-shape.

According to the present invention, the arm assembly capable of being bent substantially in a U-shape can be formed by using the two joints and the three links by connecting the opposite ends of the specific link to the diagonal joints. Thus, the arm assembly capable of being bent substantially in a U-shape can be formed by the smallest necessary number of joints and links. Thus, when the number of the joints of the arm assembly is limited, the degree of freedom of selection of the rest of the joints is increased. When the arm assembly can be bent substantially in a U-shape, the distance between the diagonal joints can be short.

In the articulated manipulator according to the present invention, the specific link may be in a middle part of the arm assembly formed by arranging the links in series.

When the specific link is in the middle part of the arm assembly formed by arranging the links in series, the middle part of the arm assembly can be bent substantially in a U-shape. The longitudinal size of the substantially U-shaped arm assembly formed by bending its middle part is small as compared with that of the same formed by being end parts of the arm assembly. Thus, the terminal part of the arm assembly can be brought nearer to the base part, and the work volume can be increased.

When a part, near one end of the arm assembly, of the arm assembly is bent substantially in a U-shape, the link connected to the base end link cannot be bent sideways relative to the base end link when the terminal link of the arm assembly is moved along the axis of the base end link to a position nearest to the base end link. According to the present invention, the arm assembly can be bent substantially in a U-shape with the link connected to the base end link bent relative to the base end link. Thus, the terminal link can longitudinally be brought nearer to the base end link to further increase the work volume.

In the articulated manipulator according to the present invention, the links may be first to sixth links, the first link may be connected to a base for rotation about a rotation axis aligned with the axis of the first link, the first and the second link may be connected by the diagonal joint, the second and the third link may be connected by the diagonal joint so as to be turnable about a rotation axis parallel to a rotation axis about which the first and the second link are turned, the third and the fourth link may be connected by the diagonal joint so as to be turnable about a rotation axis perpendicular to the rotation axes about which the second and the third link are turned, the fourth and the fifth link may be connected by the coaxial joint, and the fifth and the sixth link may be connected by the diagonal joint.

The articulated manipulator according to the present invention formed by connecting the first to the sixth link has sixth degrees of freedom. A terminal part of an arm assembly formed by connecting the first to the sixth link can be positioned at a predetermined position in a predetermined orientation relative to a base part. For example, the sixth link can be positioned at a predetermined position in a predetermined orientation relative to a fixed base.

A part, formed by connecting the second to the fourth link, of the arm assembly can be bent substantially in a U-shape by turning the second to the fourth link about the rotation axes; that is, a straight structure formed by connecting the second to the fourth link can be bent substantially in a U-shape. Since the second to the fourth link can be connected in any one of a straight structure, a substantially U-shaped structure and a structure of a shape between a straight shape and a U-shape, the space in which the sixth arm is able to move can be widened. Since the third link substantially in a middle part of the arm assembly formed by connecting the first to the sixth link has the opposite ends connected to the diagonal joint, the middle part of the arm assembly formed by connecting the first to the sixth link can be bent to shape the arm assembly substantially in a U-shape. The sixth link can be brought by thus bending the middle part of the arm assembly to a position nearer to the base than a position to which the sixth link can be brought by bending an end part of the arm assembly.

The extension of the second link toward the base beyond the joint connecting the first and the second link can be prevented because the diagonal joint connects the first and the second link. Similarly, the extension of the third link toward the base beyond the joint connecting the first and the second link can be prevented because the second and the third link are turnable about a rotation axis parallel to the rotation axis about which the first and the second link are turned. For example, when the first link extends upward from the base, the downward extension of the second and the third link beyond the joint connecting the first and the second link can be prevented.

The links excluding the fifth and the sixth link need to be moved to change the orientation of the sixth link with respect to a first axis perpendicular to the axis of the fourth link or with respect to a second axis perpendicular to the axes of the fourth and the first axis, if the fourth and the fifth link are not connected by the coaxial joint. Since the fourth and the fifth link are connected by the coaxial joint according to the present invention, only the fifth and the sixth link need to be moved to change the orientation of the sixth link with respect to the first and the second axis. Thus, the sixth link can be set at a predetermined position in a desired orientation without turning the first to the fourth links on the side of the base through large angles.

In the articulated manipulator according to the present invention, the links may be first to sixth links, the first link may be connected to a base for rotation about a rotation axis aligned with the axis of the first link, the first and the second link may be connected by the diagonal joint, the second and the third link may be connected by the diagonal joint, the third and the fourth link may be connected by the diagonal joint so as to be turnable about a rotation axis perpendicular to a rotation axis about which the second and the third link are turned, the fourth and the fifth link may be connected by the coaxial joint, the fifth and the sixth link may be connected by the diagonal joint, and the second link may consist of two sublinks connected for rotation about their axes.

The articulated manipulator according to the present invention formed by connecting the first to the sixth link has sixth degrees of freedom. A terminal part of an arm assembly formed by connecting the first to the sixth link can be positioned at a predetermined position in a predetermined orientation relative to a base part.

The rotation axis about which the second and the third link are turned can be set parallel to the rotation axis about which the first and the second link are turned by turning the sublinks of the second link. A straight structure formed by connecting the second to the fourth link can be bent substantially in a U-shape by turning the second to the fourth link about the rotation axes with the rotation axis about which the second and the third link are turned set parallel to the rotation axis about which the first and the second link are turned. Since the second to the fourth link can be connected in any one of a straight structure, a substantially U-shaped structure and a structure of a shape between a straight shape and a U-Shape, an operational space in which the sixth arm is able to move toward the base can be widened. Since the third link in a middle part of the arm assembly formed by connecting the first to the sixth link has the opposite ends connected to the diagonal joints, the middle part of the arm assembly formed by connecting the first to the sixth link can be bent to shape the arm assembly substantially in a U-shape. The sixth link can be brought by thus bending the middle part of the arm assembly to a position nearer to the base than a position to which the sixth link can be brought by bending an end part of the arm assembly. The second link having the two sublinks connected so as to be turnable about their axes can make it possible to wide further the space in which the sixth link is movable.

The links excluding the fifth and the sixth link need to be moved to change the orientation of the sixth link with respect to a first axis perpendicular to the axis of the fourth link or with respect to a second axis perpendicular to the axis of the fourth link and the first axis, if the fourth and the fifth link are not connected by the coaxial joint. Since the fourth and the fifth link are connected by the coaxial joint according to the present invention, only the fifth and the sixth link need to be moved to change the orientation of the sixth link with respect to the first and the second axis. Thus, the sixth link can be set at a desired position in a desired orientation without turning the first to the fourth links on the side of the base through large angles.

In the articulated manipulator according to the present invention, the sixth link may be provided with a twist unit for connecting a predetermined terminal device to the sixth link so as to be rotatable about a rotation axis aligned with the axis of the sixth link.

According to the present invention, the sixth link is provided with the twist unit for connecting the terminal device to the sixth link so as to be rotatable about the rotation axis aligned with the axis of the sixth link. The terminal device can be set in a desired orientation by turning the fifth and the sixth link relative to the fourth link, and turning the terminal device relative to the sixth link.

More concretely, the orientation of the terminal device with respect to the first axis perpendicular to the axis of the fourth link, the orientation of the same with respect to the second axis perpendicular to the axis of the fourth link and the first axis, and the orientation of the same with respect to the axis of the fourth link can be changed by turning the fifth and the sixth link and turning the terminal device relative to the sixth link. Thus, the first to the fourth link do not need to be turned through large angles in setting the terminal device in a desired orientation, and thus the terminal device can easily be set in a desired orientation.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

An articulated manipulator according to the present invention includes a plurality of links and a plurality of joints rotatably connecting the adjacent links. The links are connected by the joints in a straight arm assembly. The joints include coaxial joints and diagonal joints. Each coaxial joint connects the adjacent links so as to be turnable about a rotation axis aligned with the respective axes of the adjacent links. Each diagonal joint connects the two adjacent links such that one of the two adjacent links is able to make a conical revolution on the diagonal joint about a rotation axis inclined to the respective axes of the two adjacent links. In this specification, the term "conical revolution" signifies that one of two adjacent links connected by a joint revolves about a rotation axis relative to the other on an imaginary cone, and the term "turning" signifies angular displacements including those through angles not greater than 360°. The articulated manipulator thus formed by assembling the links, the coaxial joints and the diagonal joints is capable of positioning a terminal device or the free terminal device in a three-dimensional space by turning the links so that the articulated manipulator twists and turns like a snake. Thus, the articulated manipulator of the present invention is capable of satisfactorily operating in an atmosphere which has complicated facilities, narrow work paths, or narrow spaces, such as a narrow space between the ceiling and the floor spaced a short distance apart in which mechanics need to work in a crouch.

Figure 2:
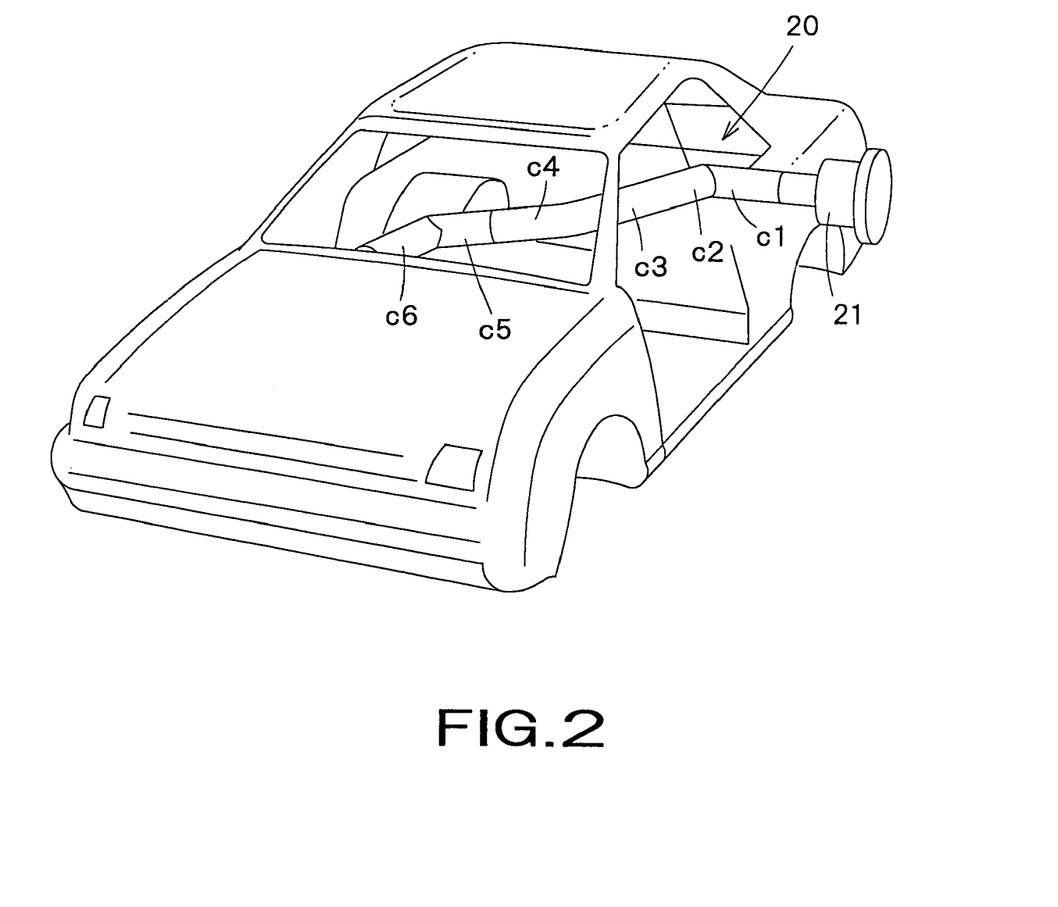
FIG. 2 is a perspective view of assistance in explaining the operation of the articulated manipulator shown in FIG. 1.

As shown in FIG. 2, the articulated manipulator of the present invention is used as an industrial robot. A desired terminal device, i.e., an end effector, can be attached to the free end of the articulated manipulator, the terminal device can be positioned at a desired position, and can operate for necessary work in a narrow space. The articulated manipulator can be used in many tasks, such as material handling, sealing, painting, arc welding and such. For example, the articulated manipulator is capable of carrying a terminal device from the outside to the inside of an automobile, and of inserting a terminal device in a space between the floor and the bottom of an automobile.

Figure 1:
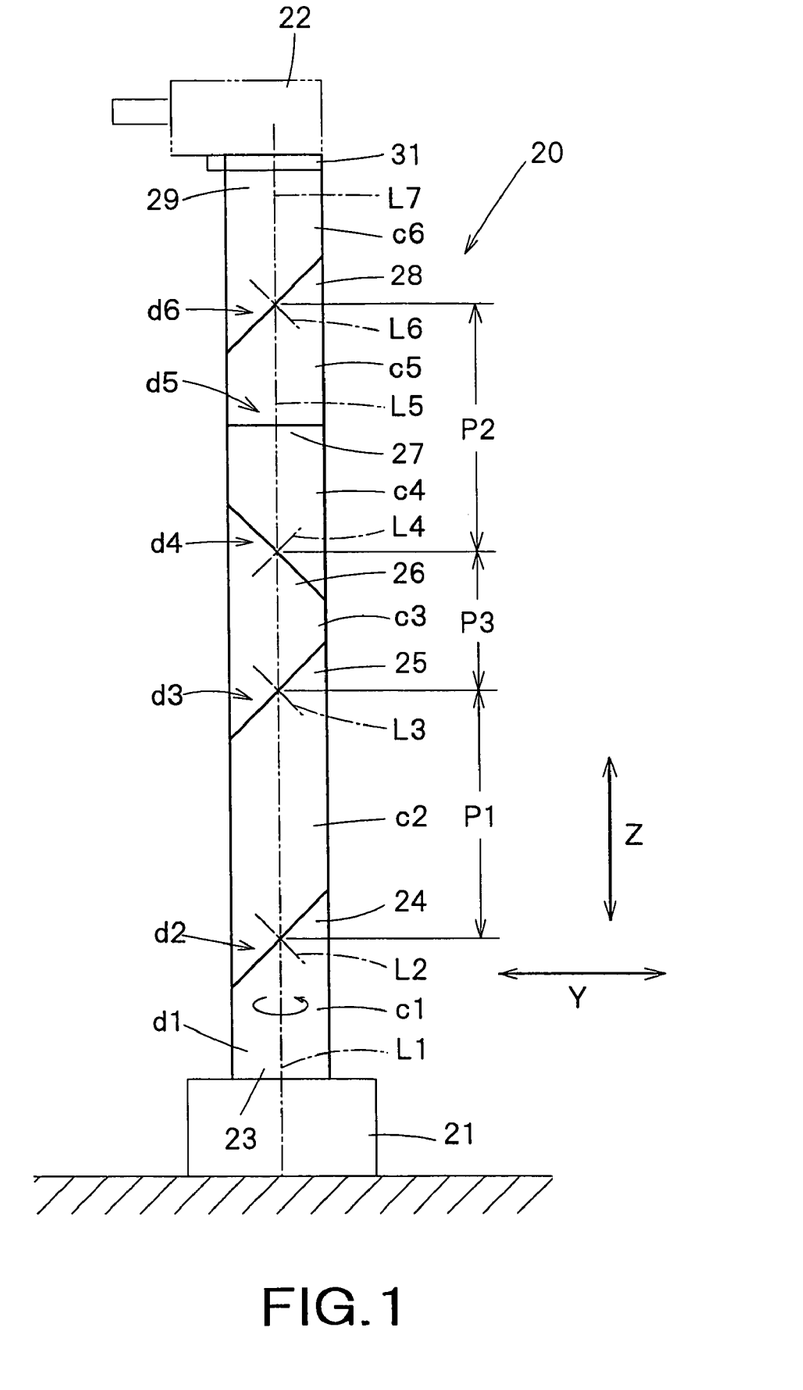
FIG. 1 is a schematic front elevation of an articulated manipulator in a first embodiment according to the present invention.

Referring to FIG. 1, an articulated manipulator 20 in a first embodiment according to the present invention is a six-degree of freedom articulated manipulator including six links, namely, a first link $c1$, a second link $c2$, a third link $c3$, a fourth link $c4$, a fifth link $c5$ and a sixth link $c6$, and six joints, namely, a first joint $d1$, a second joint $d2$, a third joint $d3$, a fourth joint $d4$, a fifth joint $d5$ and a sixth joint $d6$, connecting the adjacent links. The joints $d1$ to $d6$ connects the links $c1$ to $c6$ to form an arm assembly. The two joints $d1$ and $d5$ are coaxial joints, and the four joints $d2$, $d3$, $d4$ and $d6$ are diagonal joints. Each of the diagonal joints $d2$, $d3$, $d4$ and $d6$ connects the adjacent links such that the two adjacent links are able to revolve relative to each other about a rotation axis inclined at an angle of 45° to the respective axes of the adjacent links.

The links $c1$ to $c6$ are arranged in series in that order from a base end outward. A terminal device 22 is connected to the free end of the sixth link $c6$. The links $c1$ to $c6$ can coaxially be extended in a straight structure as shown in FIG. 1.

The coaxial joint $d1$ connects a lower end 23 of the first link $c1$ to a base 21. The base 21 may fixed1y be installed at a predetermined position or may be movable. The first link $c1$ is able to rotate about a rotation axis $L1$ coaxial with its axis relative to the base 21. The diagonal joint $d2$ connects an upper end 24 of the first link $c1$ to the second link $c2$.

The second link $c2$ is able to make a conical revolution relative to the first link $c1$ on the diagonal joint $d2$ about an inclined rotation axis $L2$ inclined at an angle of 45° to the axis of the second link $c2$. The diagonal joint $d3$ connects an upper end 25 of the second link $c2$ opposite the first link $c1$ to the third link $c3$.

The second link $c2$ and the third link $c3$ are able to make a conical revolution relative to each other on the diagonal joint $d3$ about an inclined rotation axis $L3$ inclined at an angle of 45° to the respective axes of the second link $c2$ and the third link $c3$. The rotation axis $L3$ for the conical revolution of the second link $c2$ and the third link $c3$ is parallel to the rotation axis $L2$ for the conical revolution of the second link $c2$ relative to the first link $c1$. The diagonal joint $d4$ connects an upper end 26 of the third link $c3$ opposite the second link $c2$ to the fourth link $c4$.

The third link $c3$ and the fourth link $c4$ are able to make a conical revolution relative to each other on the diagonal joint $d4$ about an inclined rotation axis $L4$ inclined at an angle of 45° to the respective axes of the third link $c3$ and the fourth link $c4$. The rotation axis $L4$ for the third link $c3$ and the fourth link $c4$ is perpendicular to the rotation axis $L3$ for the second link $c2$ and the third link $c3$. The coaxial joint $d5$ connects an upper end 27 of the fourth link $c4$ opposite the third link $c3$ to the fifth link $c5$.

The fourth link $c4$ and the fifth link $c5$ are able to rotate about a rotation axis $L5$ aligned with the respective axes of the fourth link $c4$ and the fifth link $c5$. The diagonal joint $d6$ connects an upper end 28 of the fifth link $c5$ opposite the fourth link $c4$ to the sixth link $c6$.

The fifth link $c5$ and the sixth link $c6$ are able to make a conical revolution relative to each other on the diagonal joint $d6$ about an inclined rotation axis $L6$ inclined at an angle of 45° to the respective axes of the fifth link $c5$ and the sixth link $c6$. The terminal device 22 is connected to an upper end 29 of the sixth link $c6$ opposite the fifth link $c5$ by a twist unit 31. The twist unit 31 is capable of rotating the terminal device 22 about a rotation axis $L7$ aligned with the axis of the sixth link $c6$. The terminal device 22 may be any suitable device, such as a material handling device capable of gripping parts.

The diagonal joints $d3$ and $d4$ connect the opposite ends of the third link $c3$ to the second link $c2$ and the fourth link $c4$, respectively. The third link $c3$ is substantially at the middle of the straight structure of the links $c1$ to $c6$.

A space in which the articulated manipulator 20 operates is defined by a coordinate system having an X-axis, a Y-axis and a Z-axis, which are perpendicular to each other. In the following description, a longitudinal direction in which the axis of the first link $c1$ extends is parallel to the Z-axis, and a transverse direction perpendicular to the longitudinal direction is parallel to the Y-axis. The distance P1 along the Z-axis between the diagonal joint $d2$ connecting the second link $c2$ and the third link $c3$, and the diagonal joint $d4$ connecting the third link $c3$ and the fourth link $c4$ is equal to the distance P2 along the Z-axis between the diagonal joint $d4$ connecting the third link $c3$ and the fourth link $c4$, and the diagonal joint $d6$ connecting the fifth link $c5$ and the sixth link $c6$.

The distance P3 along the Z-axis between the diagonal joint $d3$ connecting the second link $c2$ and the third link $c3$, and the diagonal joint $d4$ connecting the third link $c3$ and the fourth link $c4$ is short and hence the arm assembly can be bent substantially in a U-shape so that the sixth link $c6$ can be brought near to the first link $c1$ with respect to a direction parallel to the Z-axis.

Rotary motors are incorporated into the links $c1$ to $c6$ to drive the links $c1$ to $c6$ for rotation. The links $c1$ to $c6$ are hollow members respectively having bores. Power lines, signal lines and tubes are passed through the bores of the links $c1$ to $c6$ to supply power to the rotary motors, to send control signals to the rotary motors and to supply compressed air to the terminal device 22.

A conventional rotating mechanism may be employed for turning each of the links $c1$ to $c6$ about the rotation axis. For example, the articulated manipulator 20 may be provided for turning each of the links $c1$ to $c6$ with a rotating mechanism including bearings supporting the adjacent links for turning about the rotation axis, and a hollow waving gear mechanism, such as a Harmonic drive®. The waving gear mechanism has an input member and an output member, and the input and the output member rotate relative to each other. When the waving gear mechanism is employed, one of the adjacent links is connected to the input member, and the other is connected to the output member. When the input member is driven for rotation by the rotary motor, the input and the output member rotate relative to each other to turn the adjacent links relative to each other. The adjacent links can be turned relative to each other by providing the links c1 to c6 with such rotating mechanisms. The use of the hollow waving gear mechanism enables the adjacent links to turn relative to each other with the power lines and signal lines extended through the links c1 to c6. The articulated manipulator 20 can be suited for use in a dusty, explosive, humid working environment by covering the articulated manipulator 20 entirely or covering the power lines and signal lines extended through the bores of the links c1 to c6 with a cover formed of a waterproof, heat-resistant, shock-resistant material.

Figure 3:
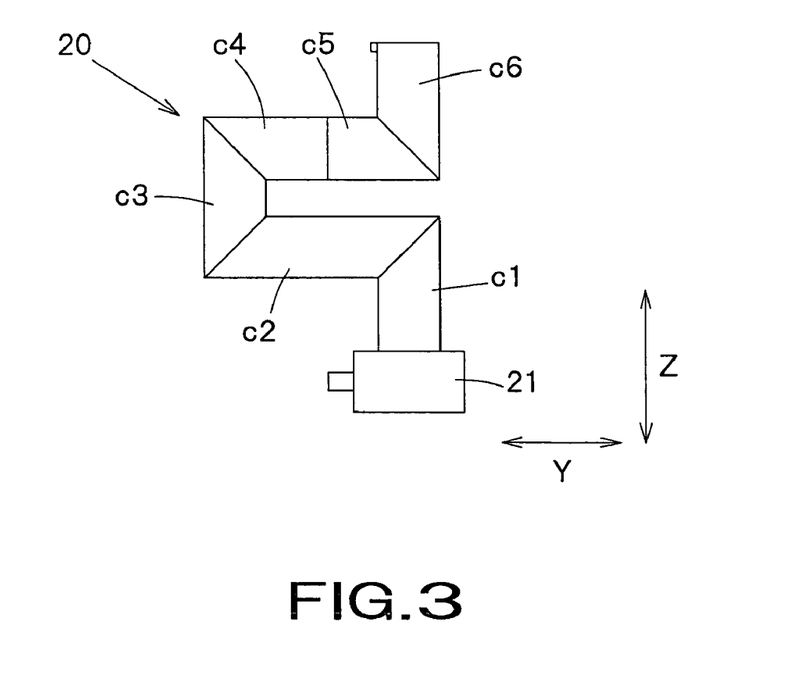
FIG. 3 is a schematic front elevation of a structure generated by the articulated manipulator shown in FIG. 1.

FIGS. 3 to 6 show the articulated manipulator 20 bent in different shapes for different purposes. The position and orientation of the terminal device 22 connected to the sixth link c6 can be changed by turning the links c1 to c6. The respective axes of the first link c1 and the sixth link c6 can be aligned with the arm assembly of the links c1 to c6 shaped substantially in a U-shape as shown in FIG. 3 by turning the first link 1 and the second link c2, the second link c2 and the third link c3, the third link c3 and the fourth link c4, and the fifth link c5 and the sixth link c6 relative to each other so that the adjacent links extend perpendicularly to each other. The sixth arm c6 can be moved parallel to the Z-axis toward the base 21 while the straight arm assembly, in which the links c1 to c6 are arranged linearly as shown in FIG. 1, is being bent to shape the arm assembly substantially in the U-shape shown in FIG. 3. The sixth link c6 can be moved parallel to the Z-axis without changing its orientation by properly regulating the turning motions of the links c1 to c6. The longitudinal size along the Z-axis of the articulated manipulator 20 can be decreased and the terminal device 22 attached to the free end of the articulated manipulator 20 can be brought near to the base 21 by bending the arm assembly of the links c1 to c6 substantially in a U-shape.

Figure 4:
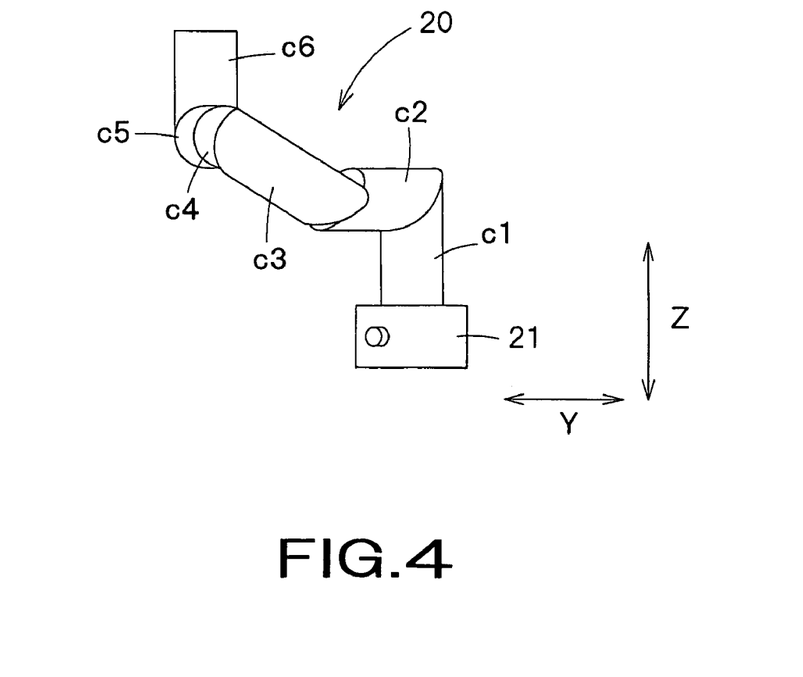
FIG. 4 is a schematic front elevation of a structure generated by the articulated manipulator shown in FIG. 1.
Figure 5:
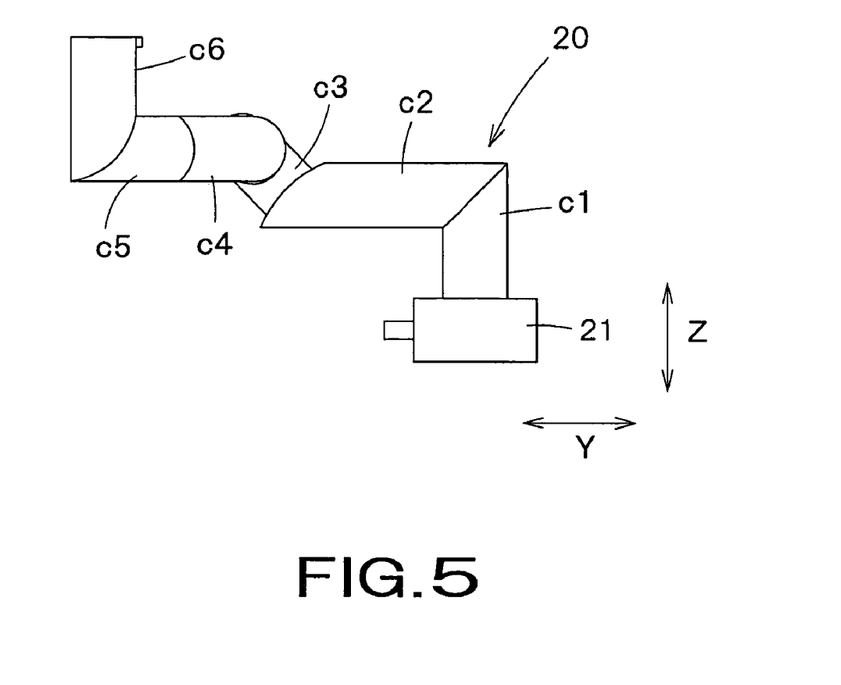
FIG. 5 is a schematic front elevation of a structure generated by the articulated manipulator shown in FIG. 1.

The transverse distance between the first link c1 and the sixth link c6 can be increased and the height, i.e., the size along the Z-axis, of the articulated manipulator 20 can be decreased as shown in FIGS. 4 and 5 by turning the third link c3 relative to the second link c2, and turning the fourth link c4 relative to the third link c3 in a state where the arm assembly is shaped as shown in FIG. 3. Thus, the sixth link c6 at a sort longitudinal distance from the base 21 can transversely be moved along the Y-axis without changing the orientation of the sixth link c6.

Figure 6:
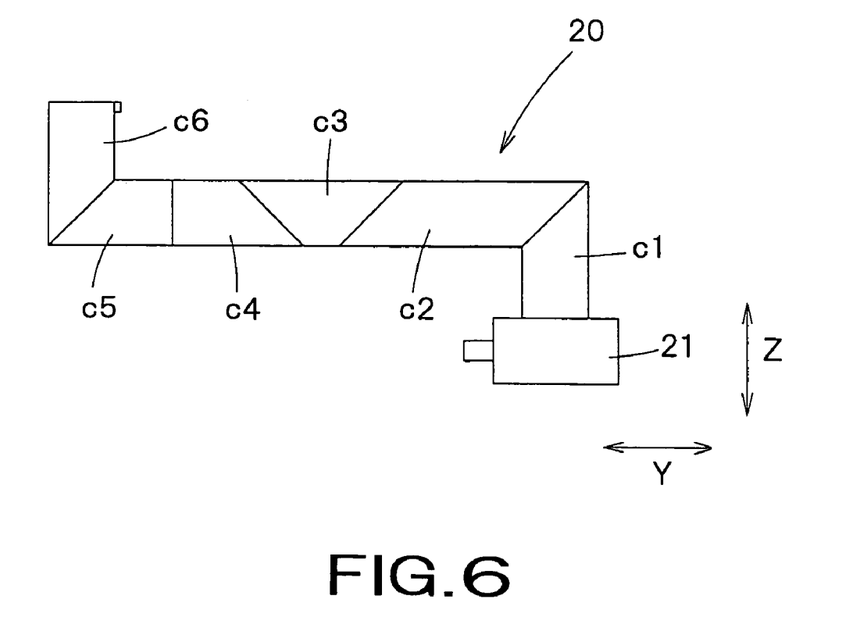
FIG. 6 is a schematic front elevation of a structure generated by the articulated manipulator shown in FIG. 1.

The second link c2, the third link c3, the fourth link c4 and the fifth link c5 can coaxially be extended as shown in FIG. 6 by turning the third link c3 relative to the second link c2 and turning the fourth link c4 relative to the third link c3 in a state where the arm assembly is shaped as shown in FIGS. 4 and 5. Thus, the sixth link c6 can be moved without changing its orientation to increase the transverse distance along the Y-axis between the sixth link c6 and the base 21.

Figure 7:
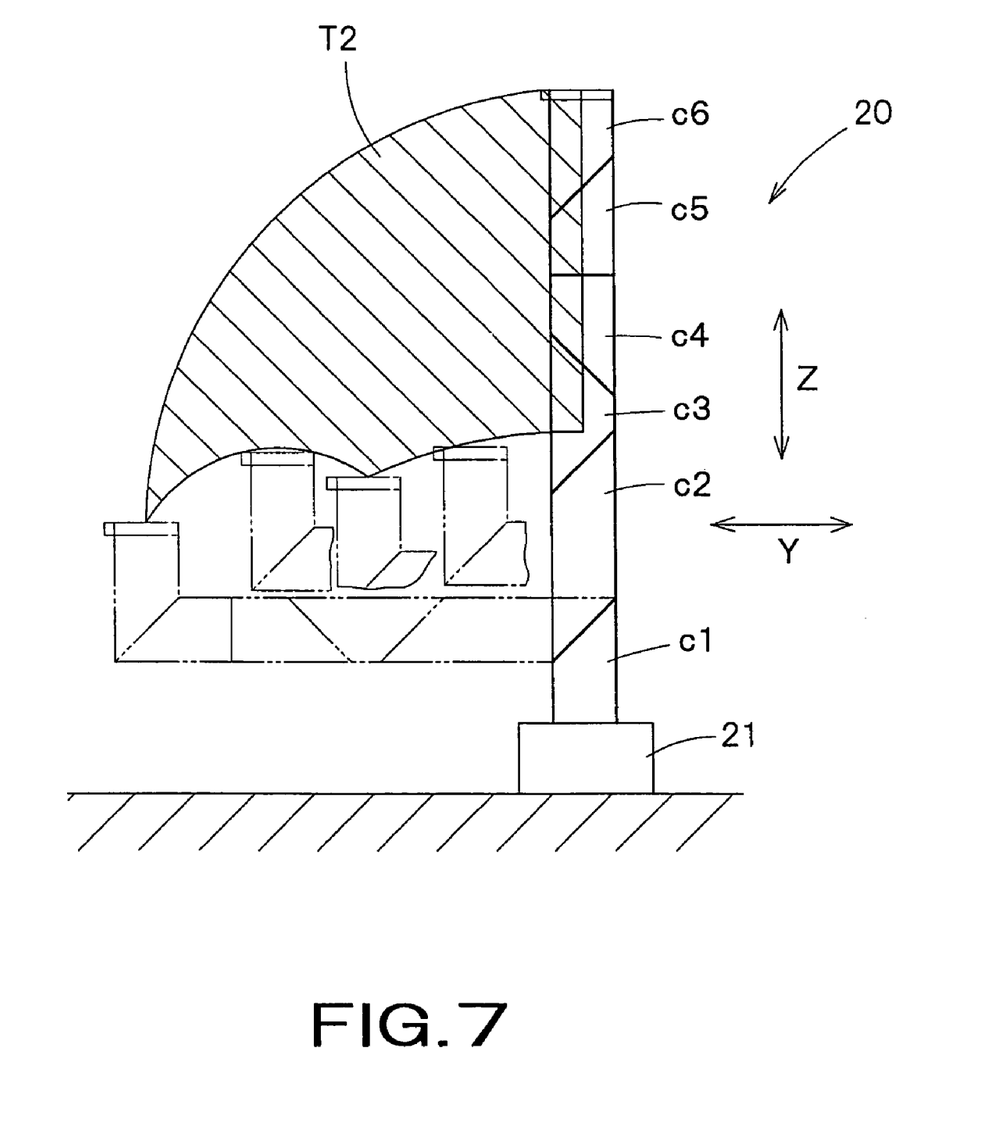
FIG. 7 is a diagrammatic view showing an operational space in which the articulated manipulator shown in FIG. 1 operates.

FIG. 7 shows the operational space of the terminal link or the terminal device. The articulated manipulator 20 formed by connecting the links c1 to c6 by the joints d1 to d6 including the four diagonal joints d2, d3, d4 and d6 has may bendable parts and is capable of moving the terminal device 22 in a predetermined orientation in a wide operational space T2. As obvious from the comparative observation of the operational space T2 of the articulated manipulator 20 of the present invention shown in FIG. 7 and the operational space T1 of the conventional articulated manipulator 1 shown in FIG. 14, the sixth link c6 of the articulated manipulator 20 can be moved parallel to the Z-axis to a position nearer to the base 21 than that to which the sixth link a6 of the conventional articulated manipulator 1 can be moved.

The articulated manipulator 20 of the present invention formed by connecting the sixth links c1 to c6 by the joints d1 to d6 is a six-degree of freedom articulated manipulator.

The straight connection of the second link c2 to the fourth link c4 and be changed into a substantially U-shaped connection by turning the second link c2 the fourth link c4 relative to each other about the inclined rotation axes L3 and L4. Since the second link c2 to the fourth link c4 can be connected in any one of a straight structure, a substantially U-shaped structure and a structure of a shape between a straight shape and a U-shape, the sixth link c6 can longitudinal be moved along the Z-axis near to the base 21. The articulated manipulator 20 can be folded in a small size by bending the same substantially in a U-shape. Bending the arm assembly can make it possible for the articulated manipulator 20 to be conveyed and stored easily.

Since the third link c3 is substantially in a middle part of the straight arm assembly formed by connecting the first link c1 to the sixth link c6, a substantially middle part of the arm assembly can be bent to shape the arm assembly substantially in a U-shape. The sixth link c6 can be brought by thus bending the middle part of the arm assembly to a position nearer to the base 21 than a position to which the sixth link c6 can be brought by bending an end part of the arm assembly formed by connecting the first link c1 to the sixth link c6. The sixth link c6 can be brought to a position nearer to the base 21 than a position to which the same can be brought by bending the arm assembly formed by connecting the first link c1 to the sixth link c6 substantially in a U-shape by bending parts near the opposite ends of the arm assembly. Thus, the sixth link c6 can be moved in a wide operational space.

The articulated manipulator 20 can be shaped substantially in a U-shape by using the smallest necessary joints because the second link c2 and the fourth link c4 connected to the opposite ends of the third link c2 can perpendicularly be extended relative to the third link c3. For example, when the number of the joints is limited, the links can be connected substantially in a U-shape by the smallest number of joints, and the number of diagonal joints among the rest of the joints can be increased. The longitudinal size along the Z-axis of a substantially U-shaped part of the articulated manipulator 20 is shorter than that of a substantially U-shaped part of an articulated manipulator in which links are connected by a coaxial joint, and other two links are connected to the free ends of the two links connected by the coaxial joint by diagonal joints.

To form the articulated manipulator 20 having six degrees of freedom by connecting the links by the six joints d1 to d6, the six joints may include the four diagonal joints d2, d3, d4 and d6. The terminal device 22 can be set in a desired orientation by turning the fifth link c5 and the sixth link c6 relative to the fourth link c4, and turning the terminal device 22 about the axis of the sixth link c6 by the twist unit 31. Thus, the terminal device 22 can be set in a desired orientation without turning the links c1 to c4 on the side of the base 21 through large angles. When the angular position of the terminal device 22 about the axis of the sixth link c6 does not need to be adjusted, the twist unit 31 rotatably connecting the terminal device 22 to the sixth link c6 may be omitted.

The distance P1 along the Z-axis between the diagonal joint d2 connecting the second link c2 and the third link c3, and the diagonal joint d4 connecting the third link c3 and the fourth link c4 is equal to the distance P2 along the Z-axis between the diagonal joint d4 connecting the third link c3 and the fourth link c4, and the diagonal joint d6 connecting the fifth link c5 and the sixth link c6. Therefore, the sixth link c6 can be set coaxially with the first link c1 by bending the arm assembly substantially in a U-shape.

The diagonal joints d2, d3, d4 and d6 may be connected to the links so as to rotate about rotation axes inclined to the axes of the links at angles other than 45°, as long as the arm assembly can be bent substantially in a U-shape by turning the second link c2, the third link c3 and the fourth link c4. The respective rotation axes of the diagonal joints may have different angles.

According to the present invention, for example, the rotation-axis about which the second link c2 and the third link c3 are turned may be inclined at an angle of 30° to the axes of the links c2 and c3, and the rotation axis L4 about which the third link c3 and the fourth link c4 are turned may be inclined at an angle of 60° to the axes of the links c3 and c4, when the rotation axis L3 about which the second link c2 and the third link c3 are turned, and the rotation axis L4 about which the third link c3 and the fourth link c4 are turned are perpendicular to each other.

The angle between the rotation axis L2 about which the first link c1 and the second link c2 are turned relative to each other, and the axes of the links c1 and c2, and the angle between the rotation axis L6 about which the fifth link c5 and the sixth link c6 are turned relative to each other, and the axes of the links c5 and c6 may be other than 45°. When the rotation axes L2 and L5 are inclined so, the sixth link c6 transversely displaced along the Y-axis relative to the base 21 can be brought nearer to the base 21 with respect to a longitudinal direction parallel to the Z-axis.

Figure 8:
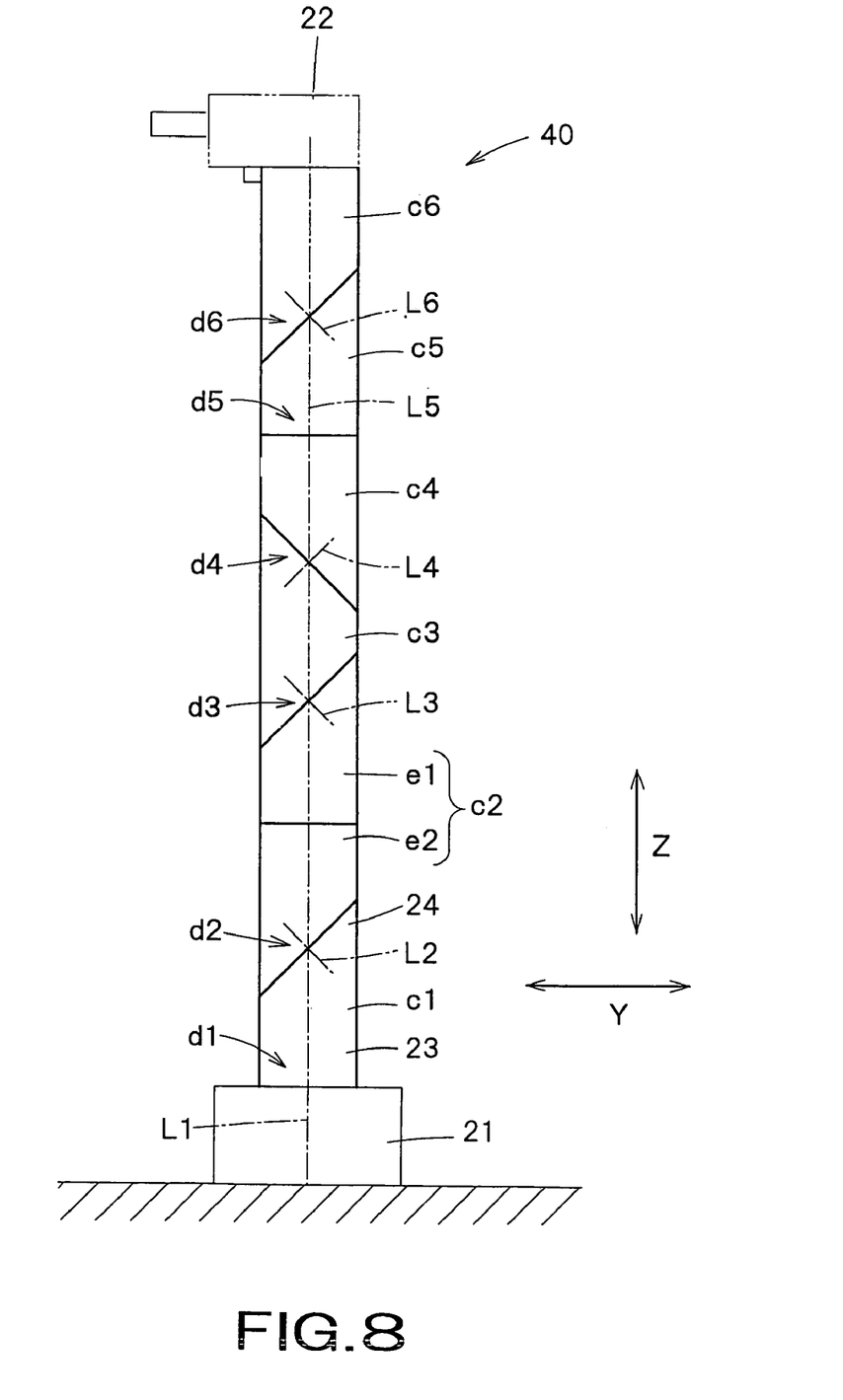
FIG. 8 is a schematic front elevation of an articulated manipulator in a second embodiment according to the present invention.

An articulated manipulator 40 in a second embodiment according to the present invention shown in FIG. 8 is analogous in construction to the articulated manipulator 20 shown in FIG. 1. Parts of the articulated manipulator 40 like or corresponding to those of the articulated manipulator 20 are denoted by the same reference characters and the description thereof will be omitted. The articulated manipulator 40, similarly to the articulated manipulator 20, includes six links, namely, a first link c1, a second link c2, a third link c3, a fourth link c4, a fifth link c5 and a sixth link c6, and six joints, namely, a first joint d1, a second joint d2, a third joint d3, a fourth joint d4, a fifth joint d5 and a sixth joint d6. The second link c2 consists of two sublinks e1 and e2 connected for rotation about their axes.

The angular relation between a rotation axis L2 about which the first link c1 and the second link c2 are turned relative to each other, and a rotation axis L3 about which the second link c2 and the third link c3 are turned relative to each other can optionally be adjusted by turning the sublinks e1 and e2 of the second link c2 relative to each other. The rotation axis L2 about which the first link c1 and the second link c2 are turned relative each other, and the rotation axis L3 about which the second link c2 and the third link c3 are turned relative to each other can be twisted perpendicularly to each other, parallel to each other or at an angle other than 90° to each other by turning the sublinks e1 and e2 of the second link c2 relative to each other. Thus, the operational space of the sixth link c6 of the articulated manipulator 40 is wider than that of the sixth link c6 of the articulated manipulator shown in FIG. 1.

Figure 9:
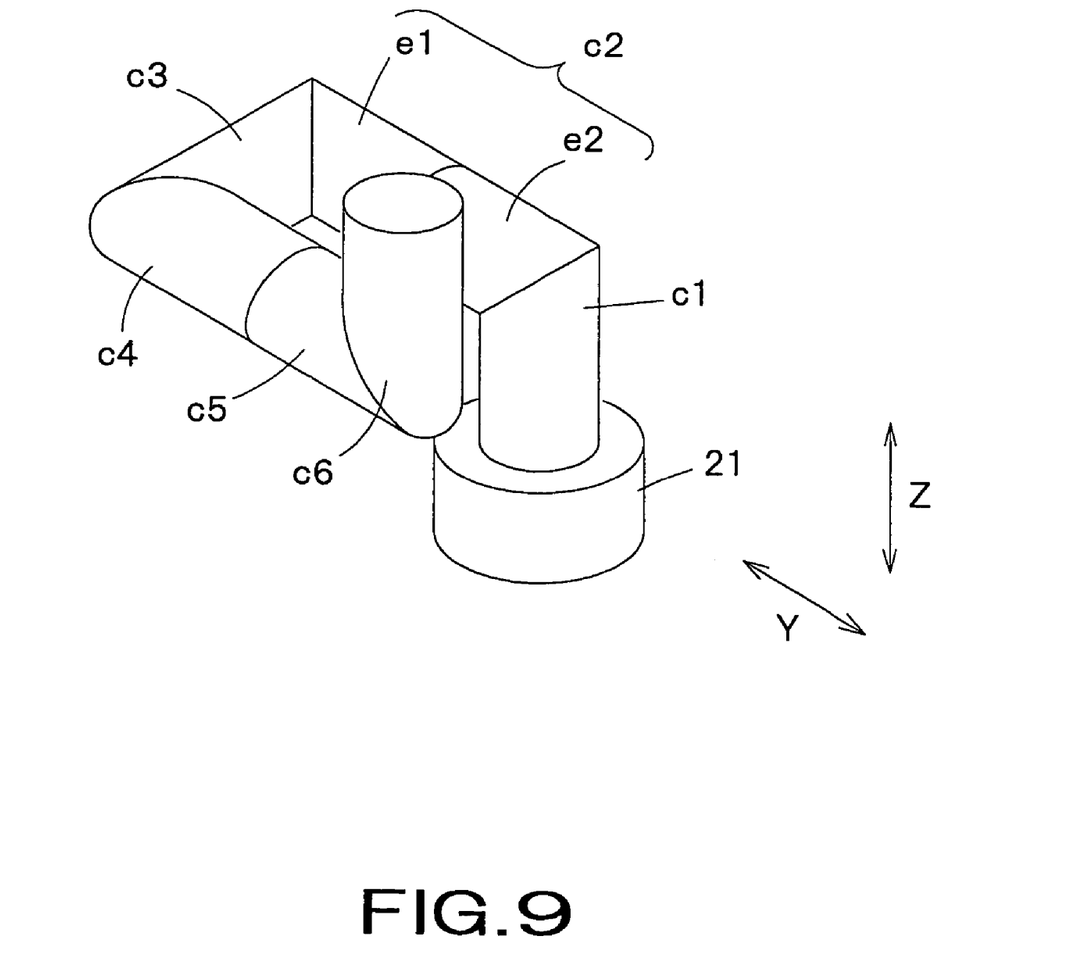
FIG. 9 is a schematic perspective view of a structure generated by the articulated manipulator shown in FIG. 8.

FIG. 9 shows the articulated manipulator 40 in a bent shape in a perspective view. A plane including the respective axes of the second link c2 and the fourth link c4 can be turned by turning the sublinks e1 and e2 relative to each other after bending the articulated manipulator 40 substantially in a U-shape as shown in FIG. 3. Namely, the state of the articulated manipulator 40 shown in FIG. 3 can be changed to the state of the articulated manipulator 40 shown in FIG. 9 by turning the sublinks e1 and e2 at an angle of 90° relative each other. Thus, the sixth link c6 can longitudinally be moved along the Z-axis toward a base 21 at a position transversely spaced from the base 21 by a distance along the Y-axis.

The articulated manipulator 40 in the second embodiment has the same effect as the articulated manipulator 20 in the first embodiment shown in FIG. 1. Turning the sublinks e1 and e2 widens the operational space of the articulated manipulator 40. The sixth link c6, similarly to that of the articulated manipulator 20 shown in FIG. 1, may be provided with a twist unit 31. The twist unit 31 facilitates the adjustment of the orientation of a terminal device 22. Various changes and modifications may be made in the foregoing embodiments. For example, the links c1 to c6 may include sublinks and joints. When the links c1 to c6 are so formed, it is preferable that the rotation axis L2 about which the first link c1 and the second link c2 are turned and the rotation axis L3 about which the second link c2 and the third link c3 are turned are parallel, the rotation axis L3 about which the second link c2 and the third link c3 are turned and a rotation axis L4 about which the third link c3 and the fourth link c4 are turned are perpendicular to each other, and the rotation axis L4 about which the third link c3 and the fourth link c4 are turned and an axis L6 about which the fifth link c5 and the sixth link c6 are turned are parallel.

The first link c1 may extend either vertically or obliquely from the base 21. Although the articulated manipulators of the present invention have been described as used as industrial robots, the articulated manipulators of the present invention may be used as transfer mechanisms in combination with other machines. There is no any restriction on the terminal device.

The diagonal joints d2, d3, d4 and d6 connect the links such that the links turn about a rotation axis inclined at an angle of 45° to their axes. For example, those diagonal joints d3, d3, d4 and d6 may connect the links such that the links turn about a rotation axis inclined at an angle other than 45° to their axes, provided that a part, formed by the second link c2, the third link c3 and the fourth link c4, of the articulated manipulator can be bent substantially in a U-shape.

If the lengths of the links are not fixed, order of arrangement of the links each having opposite ends connected to the diagonal joints may be changed. When order of arrangement of the links are changed, the sixth link c6 can be disposed near the base 21 with respect to a longitudinal direction along the Z-axis.

As apparent from the foregoing description, the straight articulated manipulator in which the links are arranged straight can be bent substantially in a U-shape. Thus, the terminal link of the articulated manipulator can be moved without changing its orientation in a wide space and makes it possible to widen the operational space of the articulated manipulator.

The articulated manipulator can be folded in a small size by bending the same substantially in a U-shape to facilitate transporting and installing the same. Bending the same can narrow spaces necessary for carrying and installing the articulated manipulator. Consequently, an increased number of articulated manipulators according to the present invention can simultaneously be transported and thereby transportation cost can be reduced. The articulated manipulator can be installed in a narrow space.

In the articulated manipulator according to the present invention, the specific link is in a middle part of the series arrangement of the links. Thus, a middle part of the arm assembly formed by connecting the links in a series arrangement can be bent substantially in a U-shape. The longitudinal size of the substantially U-shaped arm assembly formed by bending its middle part is small as compared with that of the same formed by being end parts of the arm assembly. Thus, the operational space of the terminal part of the arm assembly can further be increased.

The articulated manufacturer having the arm assembly formed by connecting the first to the sixth link in series by the joints has six degrees of freedom. The free end of the arm assembly can be positioned at a desired position in a desired orientation. Since the part, including the second to the fourth link, of the articulated manipulator can be bent substantially in a U-shape, the sixth link can longitudinal be moved relative to the base in a wide space.

The extension of the second and the third link toward the base beyond the joint connecting the first and the second link can be prevented. For example, when the base is set on the floor, the extension of the second and the third link toward the floor beyond the joint connecting the first and the second link, the collision of the second and the third link against the floor, and the resultant breakage of the second and the third link can be prevented.

The articulated manipulator having the arm assembly formed by connecting the first to the sixth link in series by the joints has six degrees of freedom. The outer end of each of the links can be positioned at a desired position in a desired orientation. Since the part, including the second to the fourth link, of the articulated manipulator can be bent substantially in a U-shape, the sixth link can be moved in a wide operational space.

The extension of the second and the third link toward the base beyond the joint connecting the first and the second link can be prevented. For example, when the base is set on the floor, the collision of the second and the third link against the floor, and the resultant breakage of the second and the third link can be prevented. When the second link consists of the two sublinks connected for turning about the axis of the second link, the operational space of the sixth link can further be widened.

In the articulated manipulator according to the present invention, the sixth link is provided with the twist unit for connecting the terminal device to the sixth link so as to be rotatable about a rotation axis aligned with the axis of the sixth link. The terminal device can be set in a desired orientation by turning the fifth and the sixth link and turning the terminal device about the axis of the sixth link. Thus, the first to the fourth link do not need to be turned through large angles in setting the terminal device in a desired orientation, and thus the terminal device can easily be set in a desired orientation.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. An articulated manipulator comprising:
   a base;
   first to sixth links arranged in series on the base; and
   a plurality of joints rotatably connecting the base and the first link, and the two adjacent links out of the first to sixth links,
   wherein, the joints include first and second coaxial joints and first to fourth diagonal joints,
   the first link is connected to the base by the first coaxial joint for rotation about a rotation axis coaxial with an axis of the first link,
   the first link and the second link are connected to each other by the first diagonal joint for rotation about a rotation axis inclined at an angle of 45 degrees relative to the first axis of the first link,
   the second link and the third link are connected to each other by the second diagonal joint for rotation about a rotation axis inclined at an angle of 45 degrees relative to the axis of the second link, the rotation axis being parallel to the rotation axes of the first and second links,
   the third link and the fourth link are connected to each other by the third diagonal joint for rotation about a rotation axis inclined at an angle of 45 degrees relative to the axis of the third link, the rotation axis being perpendicular to the rotation axes of the second and third links,
   the fourth link and the fifth link are connected to each other by the second coaxial joint for rotation about a rotation axis coaxial with the axis of the fourth link, and
   the fifth link and the sixth link are connected to each other by the fourth diagonal joint for rotation about a rotation axis inclined at an angle of 45 degrees relative to the axis of the fifth link.

2. The articulated manipulator according to claim 1, wherein the second link consists of two sublinks connected for rotation about their axes.

3. The articulated manipulator according to claim 1, wherein the sixth link is provided with a twist unit for connecting a predetermined terminal device to the sixth link so as to be rotatable about a rotation axis aligned with the axis of the sixth link.

* * * * *